(12) United States Patent
Ikebukuro

(10) Patent No.: US 9,955,678 B2
(45) Date of Patent: May 1, 2018

(54) SPOOL BRAKING DEVICE AND FISHING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 166 days.

(21) Appl. No.: 14/813,685

(22) Filed: Jul. 30, 2015

(65) Prior Publication Data

US 2016/0037759 A1    Feb. 11, 2016

(30) Foreign Application Priority Data

Aug. 8, 2014 (JP) ................................. 2014-162611

(51) Int. Cl.
*A01K 89/01* (2006.01)
*A01K 89/0155* (2006.01)

(52) U.S. Cl.
CPC .............................. *A01K 89/01555* (2013.01)

(58) Field of Classification Search
CPC .............. A01K 89/015; A01K 89/0155; A01K 89/01555
See application file for complete search history.

(56) References Cited

U.S. PATENT DOCUMENTS

| | | | | |
|---|---|---|---|---|
| 4,434,951 A | * | 3/1984 | Nakajima | A01K 89/01555 188/267 |
| 4,544,111 A | * | 10/1985 | Nakajima | A01K 89/01555 188/267 |
| 4,558,828 A | * | 12/1985 | Morimoto | A01K 89/015 242/267 |
| 4,561,605 A | * | 12/1985 | Nakajima | A01K 89/01555 188/267 |
| 4,572,454 A | * | 2/1986 | Furomoto | A01K 89/01555 242/288 |
| 4,586,674 A | * | 5/1986 | Nakajima | A01K 89/01555 242/288 |
| 4,618,106 A | * | 10/1986 | Noda | A01K 89/01555 242/290 |

(Continued)

FOREIGN PATENT DOCUMENTS

| JP | 9-298998 | 11/1997 |
|---|---|---|
| JP | 10-262518 A | 10/1998 |

(Continued)

OTHER PUBLICATIONS

Notice of Reasons for Rejection of corresponding Japanese Application No. 2014-162611 dated Jan. 23, 2018.

*Primary Examiner* — Emmanuel M Marcelo

(57) ABSTRACT

A spool braking device brakes the rotation of a spool rotatably supported by a reel body. The spool, which is a conductor that is rotated in conjunction with the spool. The magnet includes an N-pole and an S-pole on a surface that faces the rotating surface of the spool. The retaining member, the support ring, and the engagement member form a magnetic flux change rate variable mechanism. The magnetic flux change rate variable mechanism varies the change rate of the flux in the rotational circumferential direction that is affected by the magnet, at a prescribed rotating surface of the spool having a prescribed unit width in the rotational axis direction, with the rotation of the spool.

10 Claims, 10 Drawing Sheets

(56) References Cited

U.S. PATENT DOCUMENTS

| | | | | |
|---|---|---|---|---|
| 4,634,079 A | * | 1/1987 | Furomoto | A01K 89/015 242/249 |
| 4,674,699 A | * | 6/1987 | Fukushima | A01K 89/01555 242/261 |
| 5,556,048 A | * | 9/1996 | Hashimoto | A01K 89/01555 242/288 |
| 5,692,693 A | * | 12/1997 | Yamaguchi | A01K 89/01555 242/288 |
| 5,749,534 A | * | 5/1998 | Morimoto | A01K 89/01555 188/164 |
| 6,315,228 B1 | * | 11/2001 | Sato | A01K 89/015 242/261 |
| 2002/0063181 A1 | * | 5/2002 | Yamaguchi | A01K 89/0155 242/286 |
| 2013/0306777 A1 | | 11/2013 | Ikebukuro | |

FOREIGN PATENT DOCUMENTS

| | | |
|---|---|---|
| JP | 11-299403 A | 11/1999 |
| JP | 2011-206013 A | 10/2011 |
| JP | 2013-236606 A | 11/2013 |

\* cited by examiner

SPOOL BRAKING DEVICE AND FISHING REEL

CROSS-REFERENCE TO RELATED APPLICATIONS

This application claims priority to Japanese Patent Application No. 2014-162611, filed on Aug. 8, 2014, the entirety of which is hereby incorporated by reference.

BACKGROUND

Field of the Invention

The present invention relates to a spool braking device for applying a braking force to a spool that is rotatably supported by a reel body, along with a fishing reel that comprises this device.

Background Information

In a fishing reel, when a spool wound with fishing line is rotated to unreel the fishing line, there are cases in which backlash, which is when the rotational speed of the spool becomes faster than the line delivering speed during casting, occurs. When backlash occurs, so-called line slack, in which the fishing line sags causing the fishing line become tangled, occurs. Thus, a braking device that applies a braking force to the rotating reel to prevent backlash is provided. There are, in general, roughly two types of braking devices. One uses centrifugal force to apply a frictional force to the freely rotating spool, and the other applies a magnetic force to the freely rotating spool.

A braking device that applies a braking force to a freely rotating spool by applying a magnetic force comprises, for example, as disclosed in Japanese Laid-Open Patent Publication No. 1998-262518, a conductor provided to either the spool or the reel body; a magnet provided to the other of the spool or the reel body, which stops the rotation of the spool by applying a magnetic force to the conductor, a spool rotational speed controlling means that increases/decreases the magnetic force applied to the conductor by the magnet in response to the increase/decrease of the rotational speed of the spool and that controls the rotational speed of the spool; and a control effect adjustment means for adjusting the magnitude of the control effect that the spool rotational speed controlling means produces based on the increase/decrease of the rotational speed. A fishing reel in Japanese Laid-Open Patent Publication No. 1998-262518 controls the rotational speed of the spool by relatively moving either the conductor or the magnet with respect to the other according to the increase/decrease of the rotational speed of the spool, thereby increasing/decreasing the magnetic force that the magnet applies to the conductor according to the rotational speed of the spool. Consequently, decreasing the magnetic force that acts on the conductor is possible, and reducing the braking force with respect to the spool, until the rotational speed of the spool becomes relatively high in the initial stage immediately after the beginning of casting, is possible; therefore, eliminating an unnecessary load of the braking force with respect to the spool is possible. As a result, improving the flight distance of the tackle while increasing the release speed of the fishing line from the spool is possible.

Japanese Laid-Open Patent Publication No. 2013-236606 discloses a spool braking device comprising a conductor that rotates in conjunction with the spool, a magnet that is movable in the axial direction with respect to the reel body and that opposes the conductor in the radial direction, and a braking force adjustment means for stopping the rotation of the spool. The braking force adjustment means changes the range of opposition at which the conductor and the magnet are opposed in the radial direction and varies the amount of magnetic flux of the magnet that acts on the conductor according to changes in the opposing range by moving the magnet in the axial direction with respect to the reel body, based on the magnetic force of the magnet that acts on the conductor, when the conductor is rotated in a state in which the magnet and the conductor are opposing each other in the radial direction. The spool braking device of Japanese Laid-Open Patent Publication No. 2013-236606 is configured to adjust the braking force within a wide range and to appropriately apply to the spool a braking force corresponding to the rotation of the spool.

SUMMARY

In the technique of the present embodiments, a spool rotational speed controlling means or device (braking force adjustment means or device) adjusts the magnitude of the braking force via the magnetic force by moving either the conductor or the magnet in the rotational axis direction of the spool in response to the increase/decrease of the rotational speed of the spool. With this kind of braking force adjustment device, a certain amount of weight is needed in order to obtain the centrifugal force necessary to move the conductor or the magnet; additionally, space for this movement is also needed. For this reason, the above has inhibited a reduction in the weight and size the device, thereby also inhibiting a reduction in the weight and the size of the reel.

The present invention was devised to solve these problems and aims to achieve a reduction in the weight and size of a spool braking device used for a fishing reel.

A spool braking device according to a first aspect of the present invention is a spool braking device that stops the rotation of the spool that is rotatably supported by the reel body and that comprises a conductor, which rotates in conjunction with the spool, and a magnet, which has an N-pole and S-pole on a surface that faces the rotating surface of the conductor. Additionally, this spool braking device comprises a magnetic flux change rate variable mechanism, which varies the change rate of the flux in a rotational circumferential direction that is affected by the magnet at a prescribed rotating surface having a prescribed unit width in a direction that is orthogonal to the rotational circumferential direction of the conductor based on the rotation of the conductor.

Preferably, this magnetic flux change rate variable mechanism comprises a moving mechanism that moves the magnet in a direction in which the change rate of the flux at a prescribed rotating surface in the rotational circumferential direction of the conductor is increased, converting a reaction force to an induction force caused by the magnet by a movement of the conductor.

Preferably, this magnetic flux change rate variable mechanism comprises a biasing unit for moving the magnet in a direction in which the change rate of the flux at a prescribed rotating surface in the rotational circumferential direction of the conductor is decreased.

Preferably, the magnet is turnably supported around the axis that is orthogonal to the surface of the conductor that faces the magnet, and the magnetic flux change rate variable mechanism comprises a rotating mechanism for rotating the magnet in a direction in which the N-pole and the S-pole are aligned with the rotational circumferential direction of the conductor, at a prescribed unit width in the direction that is orthogonal to the rotational circumferential direction of the rotating surface.

Preferably, the rotating mechanism comprises a rotating member that is rotatably supported around a rotational axis of a conductor, a cam that holds a magnet and is turnably supported by the rotating member around a middle of an N-pole and an S-pole while maintaining the direction of the surface of the magnet that faces the conductor, and an engagement member that engages with the cam and converts the movement of the magnet in the circumferential direction in which the conductor rotates to turn the cam.

The rotating mechanism may comprise a rotating member that is rotatably supported around a rotational axis of a conductor, a pinion that holds the magnet, comprises outer teeth on the periphery toward a surface of the magnet that faces the conductor, and that is turnably supported by the rotating member around a middle of an N-pole and an S-pole, while maintaining the direction of the surface of the magnet that faces the conductor, and a rack fixed to the reel body, comprising flat teeth that meshes with the outer teeth of the pinion formed in one row in the rotational circumferential direction of the conductor.

Alternatively, a magnet may be pivotably supported around an axis parallel to the surface of a conductor that faces the magnet, and the magnetic flux change rate variable mechanism may comprise a pivoting mechanism that pivots the magnet in the direction in which both the N-pole and the S-pole approach the rotational circumferential direction of the conductor at a prescribed unit width in the direction that is orthogonal to the rotational circumferential direction of the rotating surface.

Preferably, the device comprises two or more magnets, and each of the magnets is disposed in rotationally symmetrical positions with the rotational axis of the conductor as the symmetrical axis.

A fishing reel according to a second aspect of the present invention comprises a reel body attached to a fishing rod, a spool that is rotatably supported by the reel body and winds the fishing line onto the periphery of this body, and the spool braking device according to the first aspect of the present invention.

According to the present invention, the change rate of the flux in the rotational circumferential direction at a prescribed rotating surface having a prescribed unit width in the rotational axis direction of the conductor is varied by the rotation of the conductor, as a result, either the conductor or the magnet 51 does not need to be moved in the rotational axis direction, and reducing the weight and the size of the spool braking device 20 is possible.

BRIEF DESCRIPTION OF THE DRAWINGS

Referring now to the attached drawings which form a part of this original disclosure.

DETAILED DESCRIPTION OF EMBODIMENTS

First Embodiment

Figure 1:
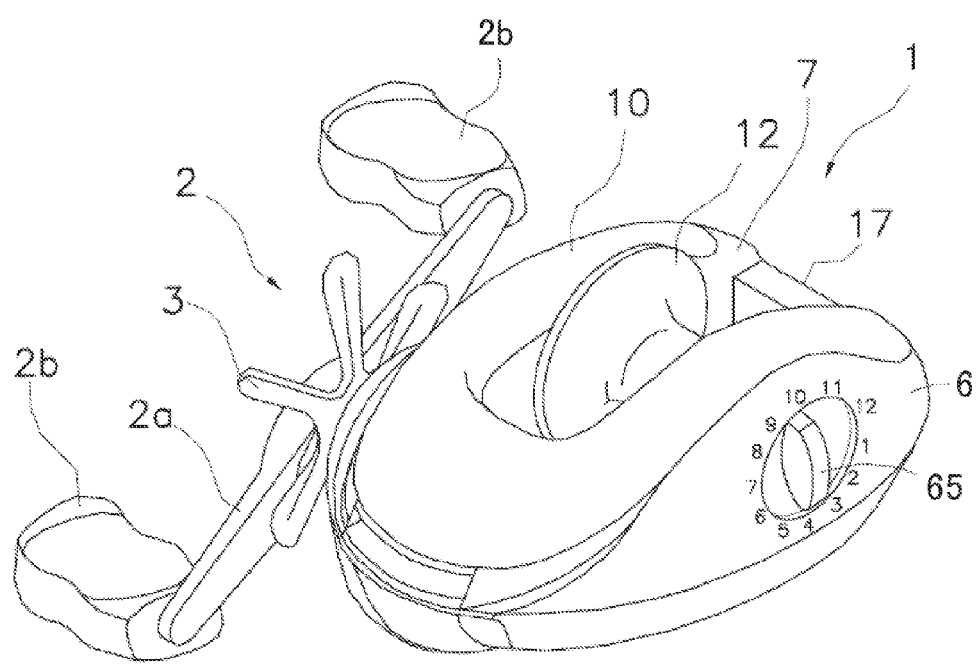
FIG. 1 is a perspective view of a fishing reel according to a first embodiment of the present invention.

FIG. 1 is a perspective view of a fishing reel according to the first embodiment of the present invention. This fishing reel is a dual-bearing reel that is used mainly for lure fishing. This dual-bearing reel comprises a reel body 1, a handle 2 disposed on the side of the reel body 1, and a star drag 3 for drag adjustment disposed on the reel body 1 side of the handle 2. A spool 12 onto which fishing line is wound is rotatably supported by the reel body 1. It is possible to wind the fishing line by turning the handle 2 to rotate the spool 12. The handle 2 comprises a plate-like arm portion 2a and a pair of grips 2b rotatably mounted to the ends of the arm portion 2a.

The fishing line is usually stretched from the spool 12 towards the left front side in FIG. 1. As shown in FIG. 1, the left front side is referred to as the front of the reel body 1, and the right rear side is referred to as the rear. A clutch operation lever 17 is disposed on the rear of the reel body 1. By operating the clutch operation lever 17, the clutch between the handle 2 and the spool 12 can be disengaged. A thumbrest 10 is mounted so as to surround the front side of the spool 12.

When the fishing line wound around the spool 12 is unreeled by a casting operation, the spool 12 is rotated. In order to prevent backlash during a casting operation, a spool brake device 20 is disposed inside of the reel body 1. An operation knob 65 for adjusting the braking force of the spool braking device 20 is disposed on the surface of the reel body 1, on the opposite side of the handle 2. By turning the operating knob 65, it is possible to adjust the braking force of the spool 12.

Figure 2:
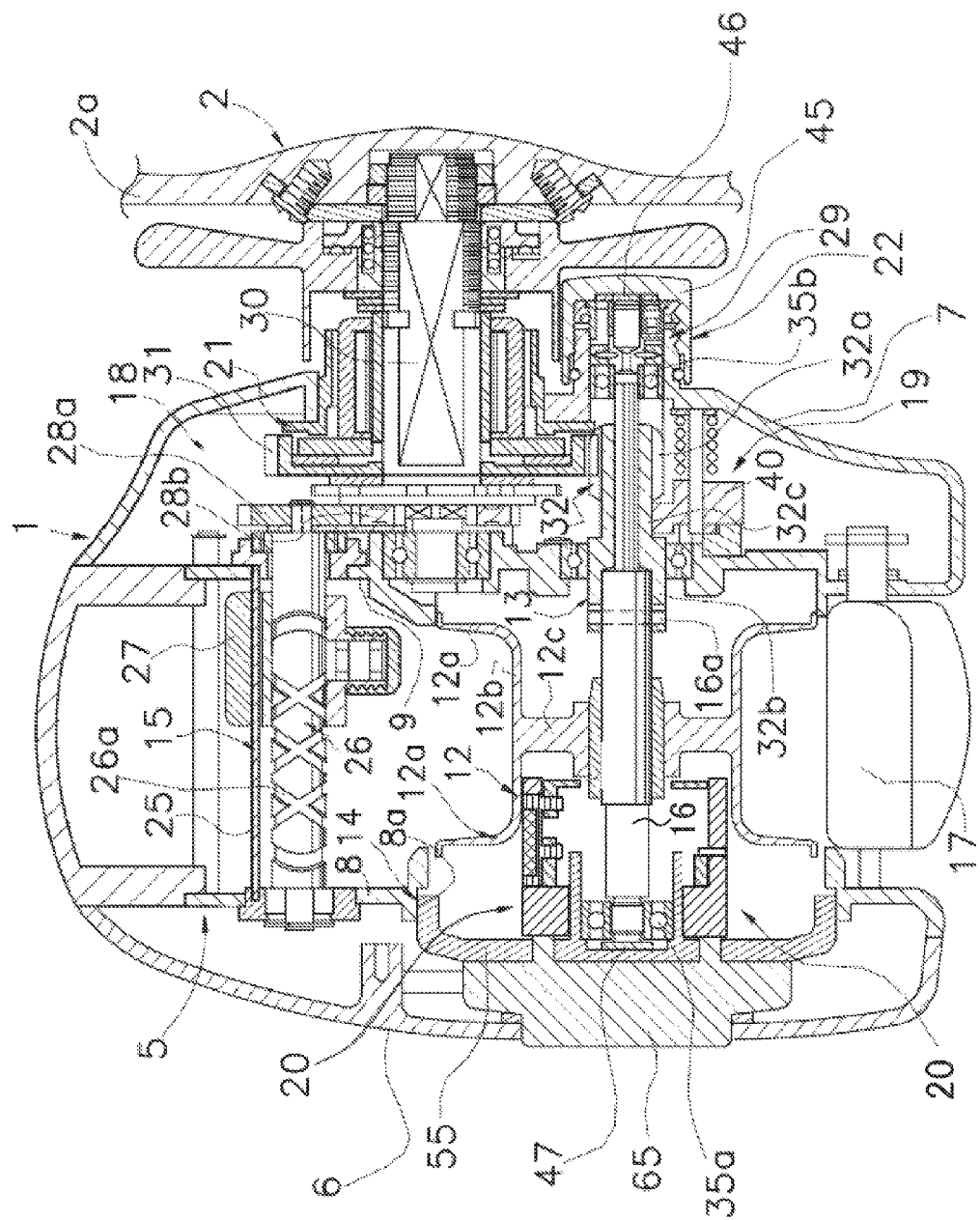
FIG. 2 is a cross-sectional view of a fishing reel according to the first embodiment.

FIG. 2 is a cross-sectional view of a fishing reel according to the first embodiment. Viewing FIG. 2 in the direction in which the characters are upright, up is the front, and down is the rear. A reel body 1 comprises a frame 5, as well as a first side cover 6 and a second side cover 7 mounted on the two sides of the frame 5. The thumbrest 10 (refer to FIG. 1) is mounted on the upper portion of the frame 5. The frame 5 comprises a pair of a first side plate 8 and a second side plate 9 arranged facing each other at a prescribed interval, as well as a plurality of coupling portions, which are not diagrammed, that couple the first side plate 8 and the second side plate 9.

The second side cover 7 on the handle 2 side is detachably fixed to the second side plate 9 by a screw. An opening 8a through which the spool 12 can pass is formed on the first side plate 8 that is on the other side of the handle 2. A brake case 55 is fixed by a screw to the first side cover 6 that is on the other side of the handle 2.

A spool 12, a level winding mechanism 15, and a clutch operation lever 17 are arranged inside of the frame 5. The level winding mechanism 15 is a mechanism for evenly winding the fishing line onto the spool 12. The clutch operation lever 17 is where the thumb is placed when conducting thumbing.

A gear mechanism 18, a clutch mechanism 13, a clutch engagement and disengagement mechanism 19, a drag mechanism 21, and a casting control mechanism 22 are arranged between the second side plate 9 and the second side cover 7 of the frame 5. The gear mechanism 18 transmits the torque from the handle 2 to the spool 12 and the level winding mechanism 15. The clutch engagement and disengagement mechanism 19 engages and disengages the clutch mechanism 13 in response to the operation of the clutch operation lever 17. The drag mechanism 21 brakes the spool 12 during line delivering. The casting control mechanism 22 can perform braking by sandwiching both ends of a spool axis 16. Additionally, a spool braking device 20 for suppressing backlash during casting is disposed in the opening 8a.

The spool 12 is, for example, made of an aluminum alloy and is a nonmagnetic electrical conductor. The spool 12 may be regarded as a conductor that is rotated in conjunction with the spool 12. The spool 12 comprises a plate-shaped flange 12a on both sides that are continuous with a tubular line winding cylinder part 12b and both ends thereof. The spool 12 comprises a tubular boss portion 12c that is integrally formed on both inner peripheral sides of the line winding cylinder part 12b. The spool 12 is fixed to a spool shaft 16 that extends through the boss portion 12c so as to not rotate relatively, for example, by serration bonding.

The spool shaft 16 extends through the second side plate 9 and extends outward from the second side cover 7. The end of the spool shaft 16 close to the handle 2 is supported by an axle bearing 35b to be freely rotatable with respect to a boss portion 29 that is formed on the second side cover 7. The end of the spool shaft 16 that is close to the first side cover 6 is supported by an axle bearing 35a to be freely rotatable in an inner cylindrical portion 55a of the brake case 55.

The level winding mechanism 15 comprises a guide tube 25 fixed between the first side plate 8 and the second side plate 9, a screw shaft 26 rotatably disposed in the guide tube 25, and a line guide 27. A gear 28a that forms a gear mechanism 18 is fixed to the end of the screw shaft 26. Spiral grooves 26a are formed on the screw shaft 26. The line guide 27 meshes with this spiral groove 26a. The line guide 27 is reciprocated along the guide tube 25 as the screw shaft 26 rotates via the gear mechanism 18. Fishing line is inserted in this line guide 27. Since the screw shaft 26 rotates in synchronization with the spool shaft 16, the fishing line can be evenly wound around the spool 12.

The gear mechanism 18 is formed by a gear 28a, a gear 28b that meshes with the gear 28a, a drive gear 31, and a tubular pinion gear 32 that meshes with the drive gear 31. The gear 28a is fixed to the end of the screw shaft 26 described above, and the gear 28b that meshes with the gear 28a is fixed so as to not rotate relative to the handle shaft 30. The rotation of the handle shaft 30 is transmitted to the screw shaft 26 by the gear 28b and the gear 28a. The drive gear 31 is rotatably mounted to the handle shaft 30, and the rotation of the handle shaft 30 is transmitted via the drag mechanism 21.

The pinion gear 32 is disposed extending through the second side plate 9. The pinion gear 32 is a tubular member. A spool shaft 16 is inserted into the center of the pinion gear 32. The pinion gear 32 is movably mounted in the axial direction of the spool shaft 16. The pinion gear 32 comprises a teeth portion 32a that is formed on the outer periphery of the right end portion in FIG. 2 and that meshes with the drive gear 31, as well as a meshing portion 32b that is formed on the other end. A constricted portion 32c is disposed between the teeth portion 32a and the meshing portion 32b.

The meshing portion 32b is formed from a recessed groove disposed on the end surface of the pinion gear 32. A clutch pin 16a that extends through the spool shaft 16 in the radial direction fits in and engages the recessed groove. When the pinion gear 32 moves in the direction of the handle 2, the recessed groove of the meshing portion 32b and the clutch pin 16a of the spool shaft 16 are detached, and the engagement is released; as a result, the rotation of the pinion gear 32 is not transmitted to the spool 12. The clutch mechanism 13 is formed by this recessed groove of the meshing portion 32b and the clutch pin 16a.

The clutch operation lever 17 is disposed behind the spool 12 between a pair of a first side plate 8 and a second side plate 9. The clutch engagement and disengagement mechanism 19 comprises a clutch cam, which is not shown, that is fixed to the clutch yoke 40 and the clutch operation lever 17. The clutch engagement and disengagement mechanism 19 moves the clutch yoke 40 to be parallel to the shaft core of the spool shaft via the clutch cam, which is not shown, by turning the clutch operation lever 17. In addition, the clutch engagement and disengagement mechanism 19 moves the clutch yoke 40 so that the clutch mechanism 13 is automatically connected when the handle shaft 30 is turned in the line-winding direction.

The pinion gear 32, in a normal state of being capable of winding the fishing line, is positioned in a clutch engagement position on the spool 12 side. In this clutch engagement position, a state in which the clutch is connected, the meshing portion 32b of the pinion gear 32 and the clutch pin 16a of the spool shaft 16 are engaged. When the pinion gear 32 is moved to the handle 2 side by the clutch yoke 40, the engagement of the meshing portion 32b and the clutch pin 16a is released, resulting in a state in which the clutch is disengaged.

The casting control mechanism 22 comprises a bottomed cylindrical cap 45, a friction plate 46 that is mounted to the bottom of the cap 45, and a friction plate 47 that is mounted to the brake case 55. The cap 45 is screwed to a male threaded portion that is formed on the outer peripheral side of the boss portion 29 of the second side cover 7. The friction plate 46 and the friction plate 47 each come in contact with an end of the spool shaft 16 to sandwich the spool shaft 16. For example, when the cap 45 is rotated, the clamping force that is generated by the friction plate 46 and the friction plate 47 is adjusted. The braking force of the spool 12 is thereby adjusted.

Figure 3:
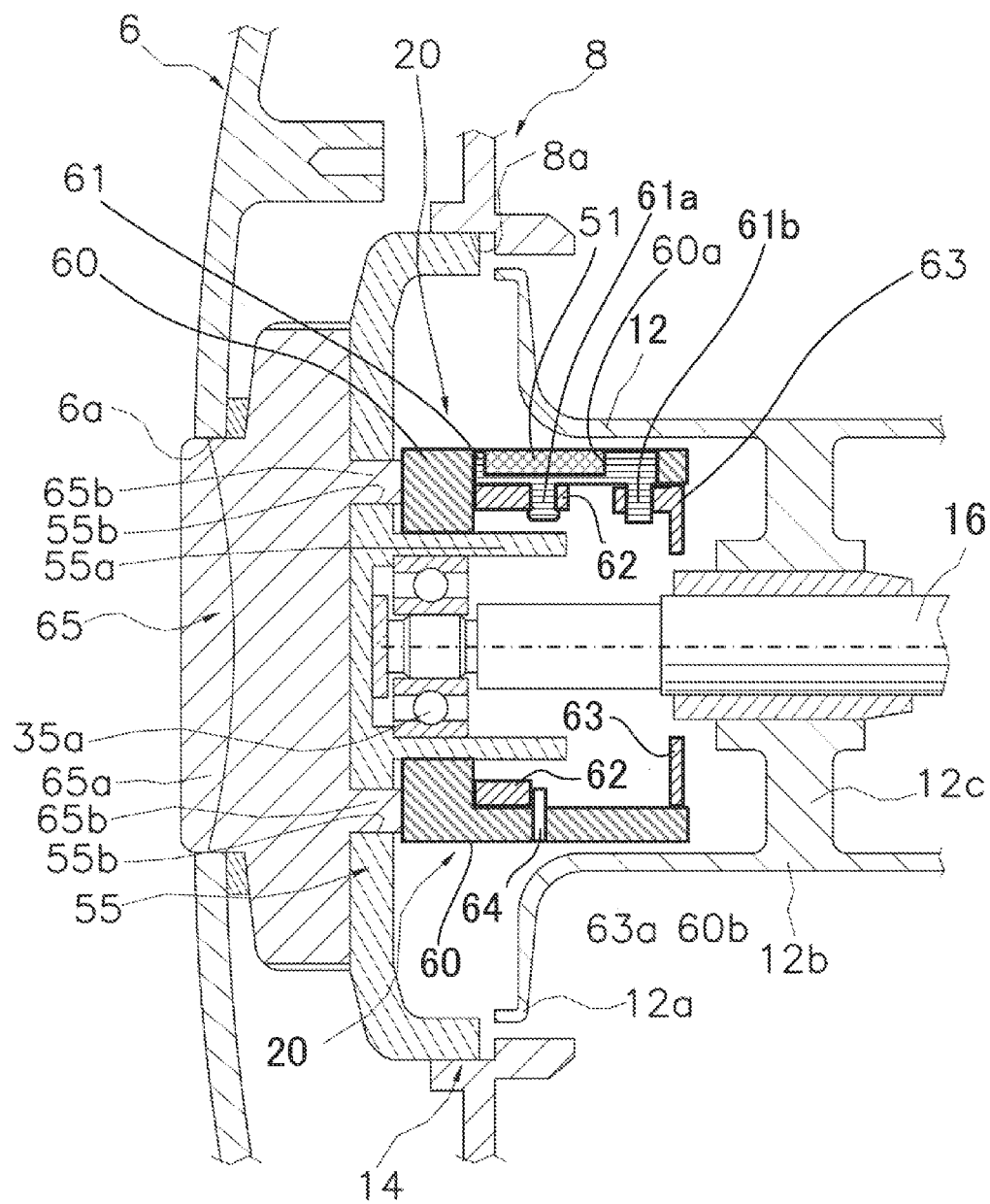
FIG. 3 is a cross-sectional view of a spool braking device according to the first embodiment.

FIG. 3 is a cross-sectional view of the spool braking device according to the first embodiment. The brake case 55 is a bottomed cylindrical member. The outer peripheral part of the brake case 55 is mounted to an opening 8a of the first side plate 8 by a bayonet structure 14. An inner cylinder portion 55a that protrudes in a tubular shape is formed in the center portion on the spool 12 side of the brake case 55. A tubular portion 60 of the spool braking device 20 is mounted on the outer peripheral part of the inner cylinder portion 55a. The inner peripheral part of the inner cylinder portion 55a supports the outer ring of the axle bearing 35a. A plurality of through-holes 55b is formed on the outer peripheral part of the proximal end portion of the inner cylinder portion 55a. A pressing portion 65b of an operating knob 65 is inserted into the through-hole 55b.

The operating knob 65 comprises a circular knob portion 65a and a plurality of pressing portions 65b, as shown in FIGS. 1 and 3. The knob portion 65a is a portion that is exposed from an opening 6 that is formed in the first side cover 6. The plurality of pressing portions 65b are protrude on the spool 12 side of the knob portion 65a. The pressing portion 65b is inserted into the through-hole 55b and abuts the bottom surface of the tubular portion 60 so as to be capable of pressing the tubular portion 60 of the spool braking device 20. The configuration of the spool braking device is described below.

The spool braking device 20 comprises a tubular portion 60, a magnet 51, a retaining member 61, a support ring 62, and an engagement member 63. The tubular portion 60 is disposed so that the center axis thereof aligns with the center axis of the spool shaft 16. FIG. 2 and FIG. 3 show cross sections of different portions of the spool braking device 20 at the top and the bottom of the inner cylinder portion 55a. The cross section of the portion with the magnet 51 is shown in the upper side of the inner cylinder portion 55a (the level winding mechanism 15 side), and the portion without the magnet 51 is shown on the lower side (clutch operation lever 17 side).

Figure 4:
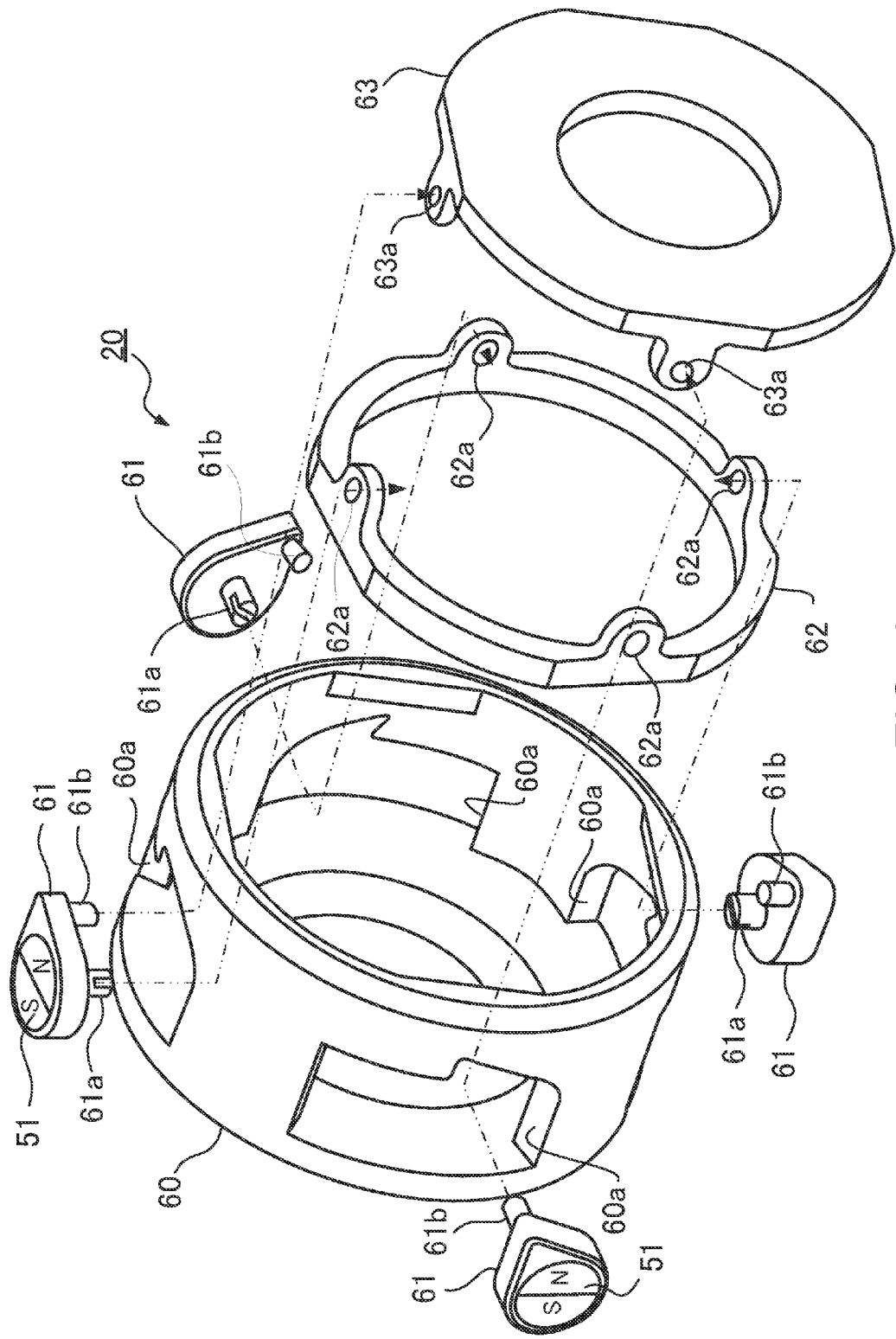
FIG. 4 is an exploded perspective view of the spool braking device according to the first embodiment.

FIG. 4 is an exploded perspective view of the spool braking device according to the first embodiment. The support ring 62 is disposed on the inner peripheral bottom portion of the tubular portion 60. The support ring 62 is regulated by, for example, a pin 64 (refer to FIG. 3) so as to not move in the axial direction of the spool shaft 16 from the inner peripheral bottom portion of the tubular portion. In FIG. 4, a member that regulates the support ring 62 in the axial direction has been omitted. The support ring 62 does not move in the axial direction with respect to the tubular portion 60 but is capable of rotating about the center axis. The same number of holes 62a as the number of retaining members 61 is formed on the support ring 62 at rotationally symmetrical positions at equal intervals.

The magnet 51 is fixed by being fitted to the retaining member 61, and the magnet 51 and the retaining member 61 are integrated. The magnet 51 comprises an N-pole and an S-pole on a surface that faces the rotating surface of the spool 12. The rotating surface in this embodiment is the inner peripheral surface of the line winding cylinder part 12b of the spool 12. The retaining member 61 that supports the magnet 51 is housed in a guide hole 60a that is formed on the side surface of the tubular portion 60. A support portion 61a and an engagement portion 61b are formed on the retaining member 61. The support portion 61a is fitted in the hole 62a of the support ring 62, and the retaining member 61 is rotatably supported with respect to the support ring 62. The periphery of the hole 62a of the support ring 62 is configured to be a plane so that the support ring 62 rotates with respect to the tubular portion 60 and rotatably supports the retaining member 61.

The engagement portion 61b of the retaining member 61 is fitted in an engagement hole 63a of the engagement member 63. There is interaction between the engagement portion 61b and the engagement hole 63a, and the engagement portion 61b can be freely rotated in the engagement hole 63a. The engagement member 63 is housed in the tubular portion 60. The engagement member 63 is supported so as to be capable of moving in the axial direction while not being capable of being rotated, with respect to the tubular portion 60. For example, the chamfered planar portion of the outer periphery of the engagement member 63 is fitted to oppose the planar portion formed on the inner peripheral surface of the tubular portion 60 and is regulated so that the engagement member 63 cannot be rotated with respect to the tubular portion 60.

A pressing spring that is not diagrammed is disposed between the inner peripheral bottom surface of the tubular portion 60 and the engagement member 63, which biases the engagement member 63 in a direction protruding out from the tubular portion 60. The engagement hole 63a of the engagement member 63 engages with an engagement portion 61b of the retaining member 61; the retaining member 61 is housed in a guide hole 60a of the tubular portion 60; and the support portion 61a of the retaining member 61 is fitted to a hole 62a of the support ring 62. Then, since the support ring 62 is regulated so as to not move in the axial direction with respect to the tubular portion 60, the engagement member 63 will not fall out of the tubular portion 60, even if biased by the pressing spring. In this state, the retaining member 61 is biased so that a line connecting the support portion 61a and the engagement portion 61b will be in the axial direction of the tubular portion 60.

The assembly of the spool braking device 20 is conducted, for example, in the following manner. The support ring 62 is disposed on the inner peripheral bottom surface of the tubular portion 60 and is regulated by, for example, the pin 64 in FIG. 3 so that the support ring 62 does not fall out. While sandwiching a pressing spring with the inner peripheral bottom surface of the tubular portion 60 and the engagement member 63, the engagement member 63 is pressed into the tubular portion 60. The hole 62a of the support ring 62 and the engagement hole 63a of the engagement member 63 are held so as to be at a distance from the support portion 61a of the retaining member 61 and the engagement portion 61b, in a position that can be seen from the guide hole 60a of the tubular portion 60; the retaining member 61, which holds the magnet 51, is inserted from the guide hole 60a; and the support portion 61a is inserted in the hole 62a of the support ring 62, and the engagement portion 61b is fitted in the engagement hole 63a. All of the retaining members 61 are fitted in the same way to complete the assembly.

Figure 5:
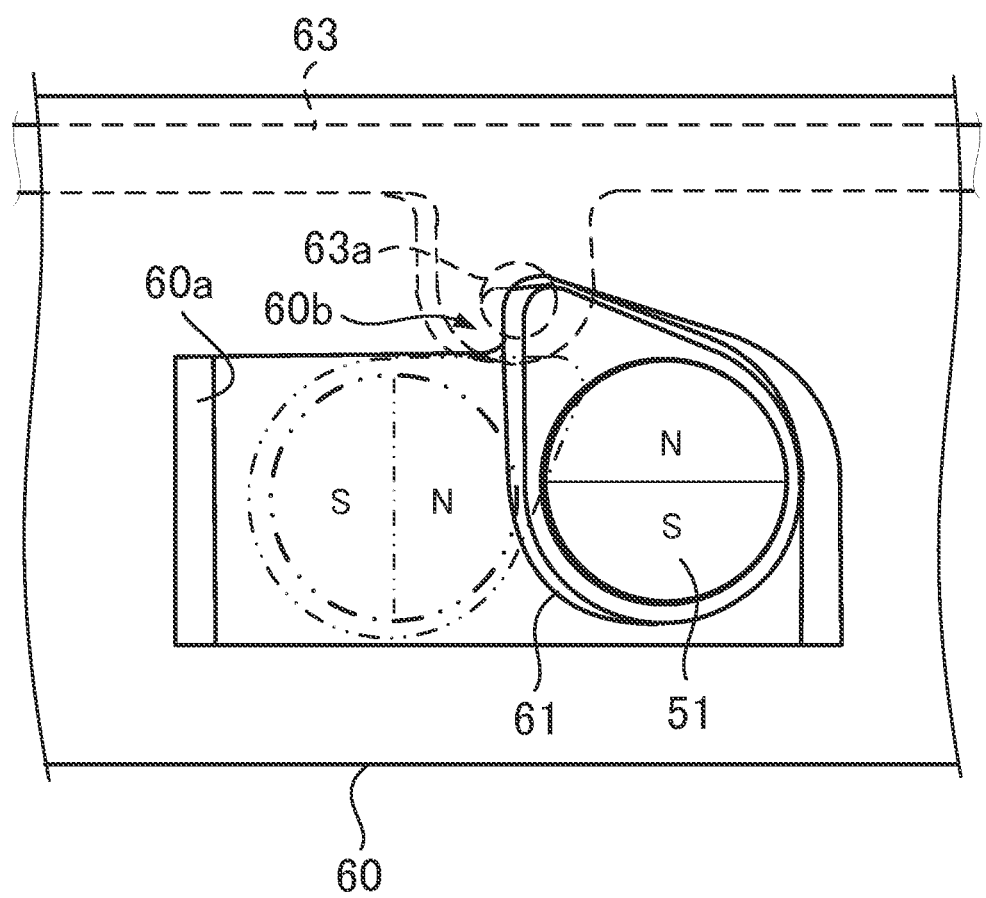
FIG. 5 is a diagram showing the operation of the spool braking device according to the first embodiment.

FIG. 5 is a diagram showing the operation of the spool braking device according to the first embodiment. FIG. 5 is the guide hole 60a portion of the tubular portion 60, as seen from the outer peripheral surface in the center axis direction. In FIG. 5, the axial direction of the spool 12 is the vertical direction, and the circumferential direction in which the spool 12 rotates is the horizontal direction. The retaining member 61 and the magnet 51, represented by the solid lines, show a state in which the spool 12 is not being rotated. The retaining member 61 and the magnet 51, represented by the chain double-dashed lines, show a state in which the spool 12 is being rotated. Since the tubular portion 60 has a cylindrical surface, both side surfaces of the guide hole 60a are visible. When the fishing line is cast, the spool 12 is rotated so that the surface that opposes the magnet 51 of the spool 12 will move in the left direction in FIG. 5.

In a state in which the spool 12 is not being rotated, the retaining member 61 is biased so that a line connecting the support portion 61a and the engagement portion 61b will be in the axial direction of the tubular portion 60 by the pressing spring, via the engagement member 63. In this state, the N-pole and the S-pole of the magnet 51 are arranged in a direction that is aligned with the axial direction of the spool 12. At this time, when viewing a part of the rotating surface of the spool 12 in the circumferential direction, the pole of one of the opposing magnets 51 that can be seen is only the N-pole or only the S-pole.

When the spool 12 is rotated, an eddy current corresponding to the rotational speed is generated in the spool 12 due to the flux of the magnet 51 that opposes the rotating surface of the spool 12. An induction force in a direction opposite of the rotational direction is applied to the spool 12 due to this eddy current. The brakes are thereby applied to the spool 12. With the reaction force converted into the induction force caused by the magnet 51 via the rotation of the spool 12 (movement of the spool surface), the magnet 51 is dragged the other way in the rotational direction of the spool 12. The retaining member 61 that holds the magnet 51 is rotatably supported by the support ring 62 via the support portion 61a and is regulated by the engagement member 63 so that the engagement portion 61b only moves in the axial direction. Then, the support ring 62 will rotate about the axis but will not move in the axial direction. Additionally, since the base portion of the engagement portion 61b is suppressed by the protrusion 60b of the guide hole 60a, the retaining member 61 moves to the left in FIG. 5 while rotating clockwise. As a result, the magnet 51 is moved as the N-pole and the S-pole are rotated in a direction that aligns with the circumferential direction in which the spool 12 is rotated. At this time, when viewing a part of the rotating surface of the spool 12 in the circumferential direction, the N-pole and the S-pole of one of the opposing magnets 51 are aligned.

Figure 6A:
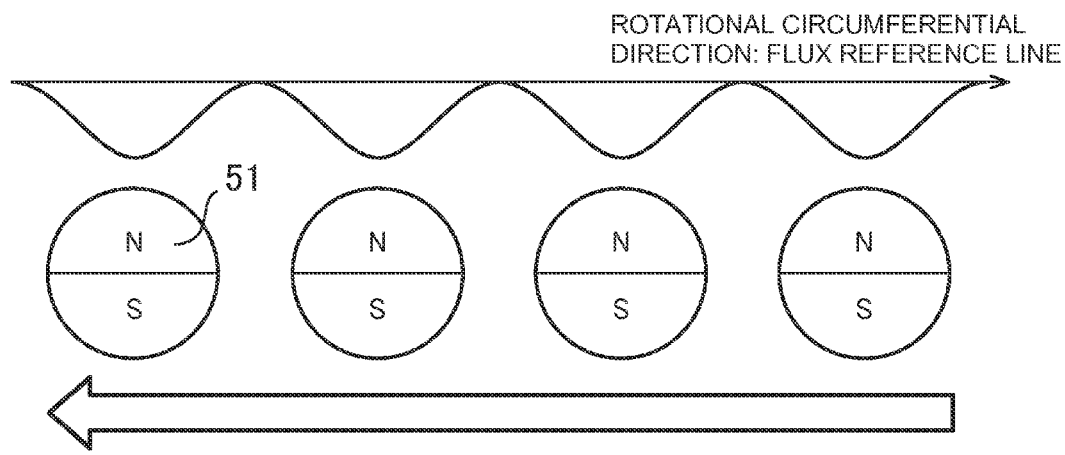
FIG. 6A is a conceptual diagram showing the flux when the spool braking device according to the first embodiment is stopped.

FIG. 6A is a conceptual diagram showing the flux when the spool braking device according to the first embodiment is stopped. The white arrow in FIG. 6A shows the direction in which the spool 12 is rotated. The N-pole and the S-pole of each magnet 51 is arranged in the rotational axis direction of the spool 12. When viewing the rotating surface (circle) that passes one point of the spool 12 that opposes the magnet 51, the pole of one of the opposing magnets 51 that can be seen is only the N-pole or only the S-pole. The flux at a rotating surface that has a sufficiently smaller width than the size of one magnetic pole can be represented as in the upper graph of FIG. 6A. Since the flux is only for the N-pole or the S-pole, the graph is only represented on one side of a flux reference line that shows the rotational circumferential direction.

Figure 6B:
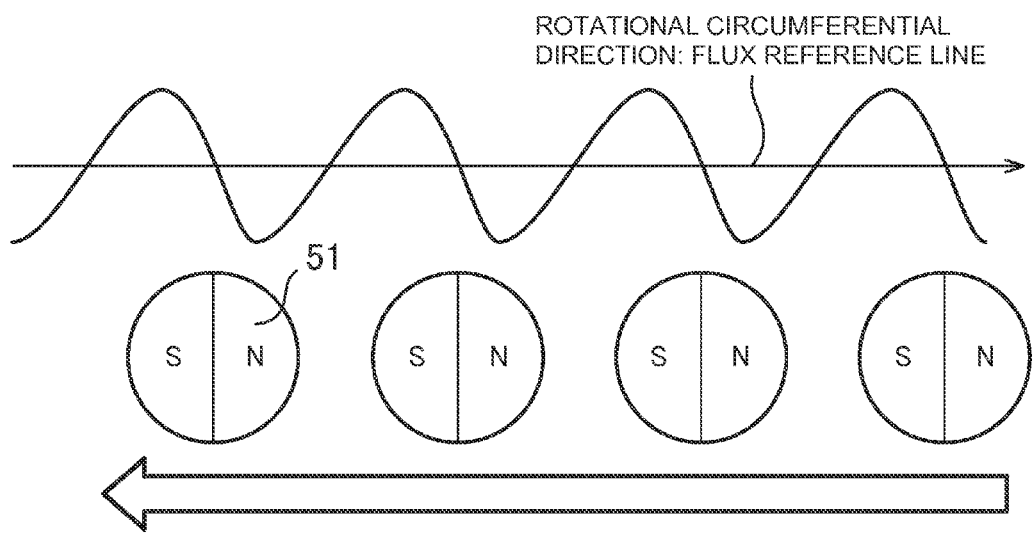
FIG. 6B is a conceptual diagram showing the flux when the spool braking device according to the first embodiment is in a maximum braking state.

FIG. 6B is a conceptual diagram showing the flux when the spool braking device according to the first embodiment is in a maximum braking state. The N-pole and the S-pole of each magnet 51 is arranged in the circumferential direction of the rotation of the spool 12. When viewing the rotating surface that passes one point of the spool 12 that opposes the magnet 51, the N-pole and the S-pole of one of the opposing magnets 51 are aligned. The flux at a rotating surface with the same small width as that in FIG. 6A can be represented as in the upper graph of FIG. 6B. Since the N-pole and the S-pole alternately appear in the circumferential direction, the graph is represented on both sides of the flux reference line that shows the rotational circumferential direction. As compared to FIG. 6A, the amplitude of the magnetic flux change is larger, and the magnetic flux variation rate in the circumferential direction is increased. That is, the change rate of the flux at the surface of the spool 12 that opposes the magnet 51 in the rotational circumferential direction of the spool 12 is increased. Since the induction force is proportional to the change rate of the flux, if the change rate of the flux in the rotational circumferential direction is increased, the induction force, that is, the braking force is increased.

In the spool braking device 20 according to the first embodiment, the magnet 51 is rotatably supported by the retaining member 61 and the support ring 62, in a direction in which the change rate of the flux at the surface of the spool 12 that opposes the magnet 51 is changed in the rotational circumferential direction of the spool 12. The engagement member 63 biases the magnet 51 in a direction in which the change rate of the flux at the surface of the spool 12 that opposes the magnet 51 in the rotational circumferential direction of the spool 12 is decreased, with a pressing spring. Then, the support ring 62, the retaining member 61 as a cam, and the engagement member 63 rotate the magnet 51 in a direction in which the change rate of the flux at the surface of the spool 12 that opposes the magnet 51 in the rotational circumferential direction of the spool 12 is increased, with the reaction force converted into the induction force caused by the magnet 51 via the rotation of the spool 12.

The engagement member 63 forms a biasing unit that moves the magnet 51 in a direction in which the change rate of the flux at a prescribed rotating surface in the rotational circumferential direction of the spool is decreased. The support ring 62, the retaining member 61 as a cam, and the engagement member 63 can be described as a moving mechanism for moving the magnet 51 in a direction in which the change rate of the flux at a prescribed rotating surface of the spool 12 in the rotational circumferential direction of the spool 12 is increased, with the reaction force converted into the induction force caused by the magnet 51 via the movement of the spool 12. In a way, the spool braking device 20 varies the change rate of the flux in the rotational circumferential direction that is affected by the magnet 51, at a prescribed rotating surface of the spool 12 having a prescribed unit width in a direction that is parallel to the rotating surface and is orthogonal to the rotational circumferential direction, that is, the rotational axis direction, via the rotation of the spool 12. More strictly speaking, the spool braking device varies the change rate of the magnetic flux density of the flux that interlinks with the rotating surface in the rotational circumferential direction. The support ring 62, the retaining member 61, and the engagement member 63 configure a magnetic flux change rate variable mechanism.

As shown in FIG. 3, in the first embodiment, only a half of the magnet 51, that is, only one magnetic pole, is opposed to the rotating surface of the spool 12. Even then, if the magnet 51 is rotated to be in the state shown in FIG. 6B, the change rate of the flux in the circumferential direction will increase, causing the braking force to increase according to the rotational speed of the spool 12. Even with the same magnet 51, if the surface of the magnet 51 that opposes the spool 12 is increased, the braking force will increase as a whole by that much. Even if the entire surface of the magnet 51 is opposed with the spool, the fact remains that the change rate of the flux in the circumferential direction is increased between the states shown in FIG. 6A and FIG. 6B; thus, the braking force is increased according to the rotational speed of the spool. Therefore, if the entire spool braking device 20 is moved in the axial direction, varying the braking force as a whole is possible.

The knob portion 65a in FIG. 3 is rotatably supported by the opening 6a. The operating knob 65 comprises a cam mechanism, which is not shown, that converts the rotation of the knob portion 65*a* into a movement of the pressing portion 65*b* in the axial direction. For example, if the operating knob 65 is rotated clockwise, the tubular portion 60 is moved in a direction approaching the spool 12 (right side in FIG. 3) due to the cam action. That is, the magnet 51 approaches the spool 12. As a result, the amount of flux that passed through the spool 12 is increased, and the braking force with respect to the spool 12 is increased.

If the operating knob 65 is rotated counterclockwise, the tubular portion 60 and the magnet 51 are moved in a direction away from the spool 12 (left side in FIG. 3) due to the cam action. That is, the magnet 51 is separated from the spool 12. As a result, the amount of flux that passed through the spool 12 is decreased, and the overall braking force is decreased. The initial braking force of the spool 12 is set by rotating the operating knob 65 in this manner.

Additionally, if the engagement member 63 is moved closer in the direction of the inner peripheral bottom surface of the tubular portion 60, in a state in which the spool 12 is stopped, the initial braking force can be increased. In other words, the ratio of the maximum braking force when the spool 12 is rotated and the minimum braking force at the beginning of rotation can be changed.

According to the spool braking device 20 of the first embodiment, the change rate of the flux in the rotational circumferential direction at a prescribed rotating surface having a prescribed unit width in the rotational axis direction of the conductor (spool 12) is varied by the rotation of the conductor, as a result, either the conductor or the magnet 51 does not need to be moved in the rotational axis direction, and reducing the weight and the size of the spool braking device 20 is possible.

The first embodiment was described with a case in which the spool 12 is the conductor as an example. However, the spool 12 does not need to be a conductor as long as there is a conductor that is linked to the spool 12. For example, a configuration in which a cylindrical conductor is bonded to the inner peripheral surface of a spool 12 formed from a nonconductive body is possible. In this case, the spool braking device 20 is disposed so that the magnet 51 opposes the conductor that is linked to the spool 12.

Additionally, in the first embodiment, a configuration was described in which the conductor is cylindrical. However, the spool braking device 20 can be applied as long as the conductor is rotated in conjunction with the spool 12. For example, the configuration of the first embodiment can be applied with modification to a case in which the conductor is a disc. The disc is, for example, a flange 12*a* of the spool 12. In this embodiment, the rotating surface is a disc surface. The magnet 51 is disposed opposing the disc surface and is rotatably supported in a direction in which the change rate of the flux at the surface of the disc that opposes the magnet 51 is changed in the rotational circumferential direction of the disc. The engagement member 63 biases the magnet 51 in a direction in which the change rate of the flux at the surface of the disc that opposes the magnet 51 in the rotational circumferential direction of the disc is decreased. Then, the support ring and the engagement member are disposed concentrically on a plane that is parallel to the disc. The support ring 62, the retaining member, and the engagement member rotate the magnet 51 in a direction in which the change rate of the flux at the surface of the disc that opposes the magnet 51 in the rotational circumferential direction of the disc is increased, with the reaction force converted into the induction force caused by the magnet 51 by the rotation of the disc. In this embodiment, the change rate of the flux in the rotational circumferential direction that is affected by the magnet 51 at a prescribed rotating surface having a prescribed unit width in a direction that is parallel to the rotating surface of the disc and is orthogonal to the rotational circumferential direction, that is, in the radial direction, is varied with the rotation of the disc as the conducting body.

In the first embodiment, a case in which there are four magnets 51 was provided as an example. However, the number of magnets 51 may be any number of one or greater, as long as the magnet has an N-pole and an S-pole on a surface that faces the rotating surface of the conductor. However, preferably, two or more magnets 51 are provided and disposed in positions that are rotationally symmetrical, so that the positions to which the braking force is applied are symmetrical with respect to the rotational axis of the spool 12. Additionally, the magnets 51 are preferably disposed at equal intervals. The arrangement of the N-pole and the S-pole of the magnet 51 may be the opposite of that shown in FIG. 4-FIG. 7. Furthermore, the arrangement of the N-pole and the S-pole of the magnet 51 does not have to be the same for all of the magnets 51. For example, magnets with opposite arrangements of the N-pole and the S-pole may be alternately disposed in the circumferential direction in which the conductor is rotated.

Modified Example

Figure 7:
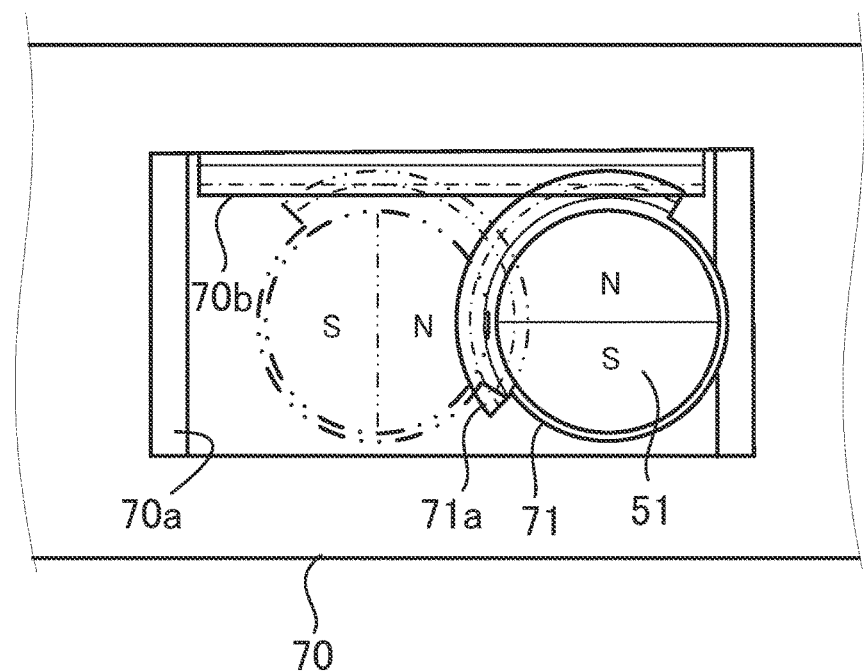
FIG. 7 is a conceptual diagram showing the operation of the spool braking device according to a modified example of the first embodiment.

FIG. 7 is a conceptual diagram showing the operation of the spool braking device according to a modified example of the first embodiment. In this modified example, a rack and pinion is used, instead of the retaining member 61, as a cam and the engagement member 63 to rotate the magnet 51. In FIG. 7, a tooth profile is represented as a rough sketch. The tooth edge is represented by the thick solid lines, the pitch is represented by the dashed lines, and the tooth bottom is represented by the thin solid lines.

The retaining member 71 that holds the magnet 51 is a pinion on the periphery of which are formed outer teeth 71*a* toward the rotating surface of the spool 12. The magnet 51 can be sufficiently rotated a maximum of 90, so that the outer teeth 71*a* do not need to be formed around the entire circumference. The retaining member 71 is rotatably supported by a support ring 62 via a shaft (support portion) that passes through the center of the magnet 51, in the same way as in the first embodiment. The support ring 62 does not move in the axial direction with respect to the tubular portion 70 and is rotatably supported around the axis, in the same way as shown in FIG. 3 and FIG. 4. In the modified example, the support ring 62 is biased in the right direction in FIG. 7 with respect to the tubular portion 70 by a torsion spring or the like, which is not shown.

Flat teeth 70*b* that are formed in a single row in the rotational circumferential direction of the spool 12 and that mesh with the outer teeth 71*a* of the pinion are formed in the guide hole 70*a* of the tubular portion 70. The position of the tubular portion 70 with respect to the reel body 1 is adjusted but may be considered to be fixed when the spool 12 is operated. The flat teeth 70*b* of the guide hole 70*a* configure a rack.

In FIG. 7, the retaining member 71 and the magnet 51 represented by the solid lines show a state in which the spool 12 is not being rotated, in the same way as in FIG. 5. The retaining member 71 and the magnet 51 represented by the chain double-dashed lines show a state in which the spool 12 is being rotated. Since the tubular portion 70 has a cylindrical surface, both side surfaces of the guide hole 70*a* are visible. When the fishing line is cast, the spool 12 is rotated so that the surface that opposes the magnet 51 of the spool 12 will move in the left direction in FIG. 7.

In a state in which the spool 12 is not rotated, the retaining member 71 is biased so that the N-pole and the S-pole are arranged in a direction that aligns with the axial direction of the spool 12 by a torsion spring via the support ring 62. When the spool 12 is rotated, the magnet 51 is dragged in the rotational direction of the spool 12 with the reaction force converted into the induction force caused by the magnet 51 by the rotation of the spool 12 (movement of the spool surface). The retaining member 71 that holds the magnet 51 is rotatably supported by the support ring 62 via the support portion, and the retaining member 71 is rotated clockwise while moving to the left in FIG. 7, since the outer teeth 71a mesh with the flat teeth 70b of the guide hole 70a. As a result, the magnet 51 is moved as the N-pole and the S-pole are rotated in a direction that aligns with the circumferential direction in which the spool 12 is rotated.

Since the movement of the magnet is the same in the modified example as in FIG. 5, as shown by FIG. 6A and FIG. 6B, the change rate of the flux in the rotational circumferential direction of the spool 12 will increase in response to the rotational speed of the spool 12, and the braking force is increased in response to the rotational speed of the spool 12. The support ring 62, the retaining member 71 as a pinion, and flat teeth 70b of the tubular portion 70, which is a rack, configure a magnetic flux change rate variable mechanism.

The braking force of the spool braking device 20 can be adjusted as a whole in the same way as in the first embodiment. In order to change the ratio of the maximum and the minimum of the braking force, the configuration should be such that the initial position of the support ring 62 when the spool 12 is not being rotated can be changed. In addition to the above, the configuration of the conductor, the number and arrangement of the magnets, and the alignment of the N-pole and the S-pole are the same as that in the first embodiment.

Second Embodiment

Figure 8:
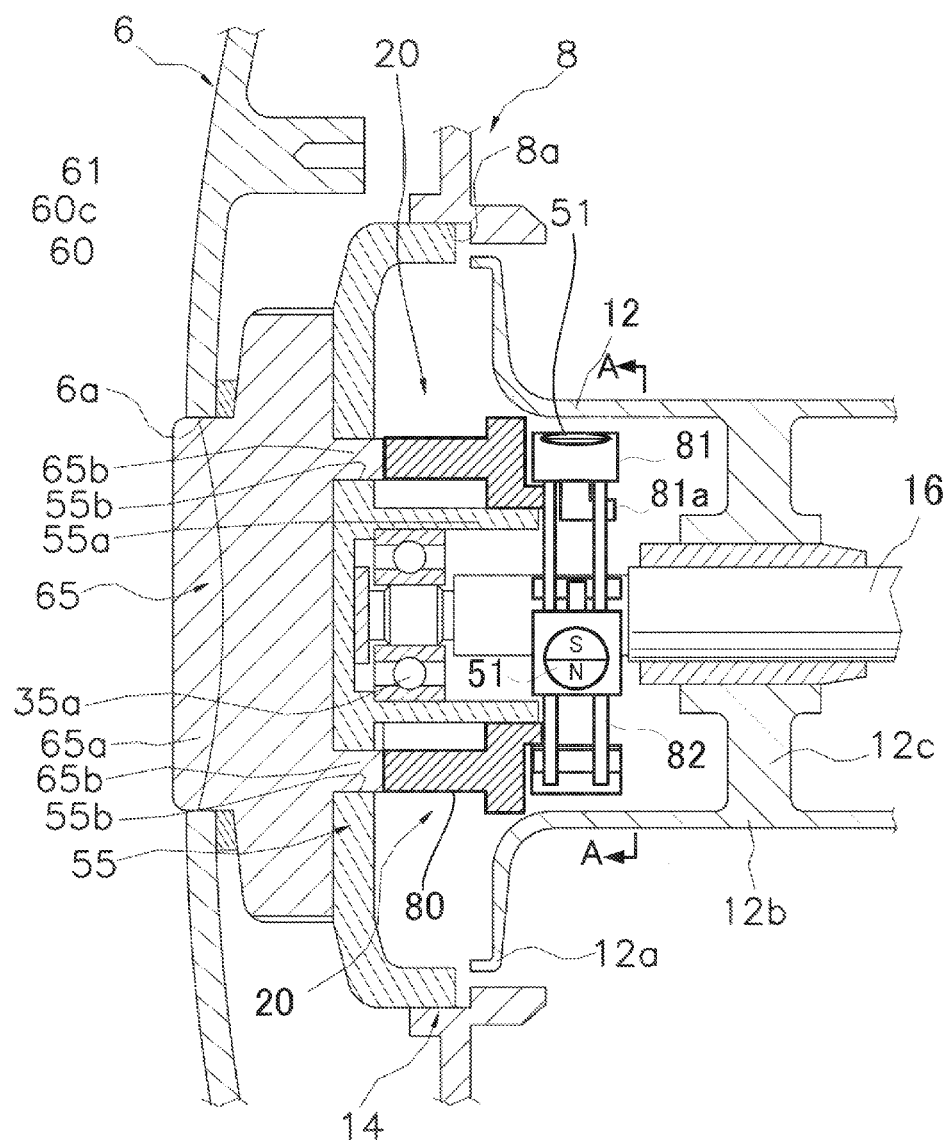
FIG. 8 is a cross-sectional view of the spool braking device according to a second embodiment of the present invention.

FIG. 8 is a cross-sectional view of the spool braking device according to the second embodiment of the present invention. In the second embodiment, the magnet 51 is pivotably supported around an axis that is parallel to the surface of the conductor that faces the magnet 51. Then, the magnet 51 is pivoted in a direction in which both the N-pole and the S-pole come close in the rotational circumferential direction of the conductor via the rotation of the conductor. The magnet 51 comprises an N-pole and an S-pole on the surface of the conductor that faces the magnet 51, as in the first embodiment. The spool 12 is also a conductor in the second embodiment.

In FIG. 8, the portions of the magnet 51, the retaining member 81, etc. are not in the cross section. The magnet 51 comprises an N-pole and an S-pole on a surface that faces the rotating surface of the spool 12. The rotating surface is the inner peripheral surface of the line winding cylinder part 12b of the spool 12. A support portion 81a is formed on the retaining member 81. The support portion 81a is fitted in a hole of a support plate 82, and the retaining member 81 is pivotably supported around an axis that is parallel to the rotational axis of the spool 12 by the support plate 82. The support plate 82 is supported by the tubular portion 80.

Figure 9:
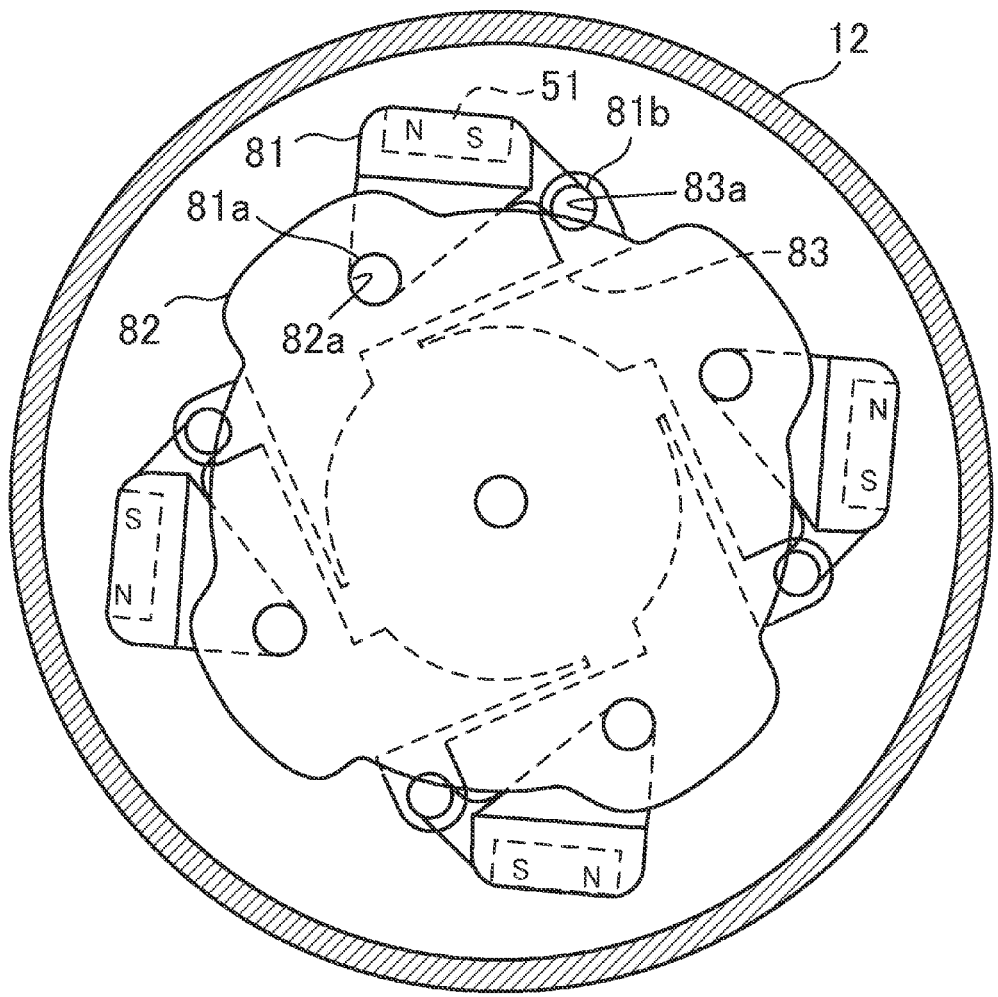
FIG. 9 is a cross-sectional view of the spool braking device according to the second embodiment when viewed in the rotational axis direction.

FIG. 9 is a cross-sectional view of the spool braking device according to the second embodiment when viewed in the rotational axis direction. FIG. 9 shows the A-A line cross section in FIG. 8. The retaining member 81 that holds the magnet 51 is pivotably supported around an axis that is parallel to the rotating surface of the spool 12 and that is orthogonal to the rotational circumferential direction, which is separated from a surface that passes through the center of the magnet 51 and the rotational axis of the spool 12, with the support portion 81a being fitted to the hole 82a of the support plate 82. The magnet 51 is pivotably supported on the back surface side of the magnet 51, which is on the opposite side of the surface that faces the rotating surface. The support plate 82 does not move with respect to the reel body 1, even when the spool 12 is rotated.

An engagement portion 81b is formed on the retaining member 81. The engagement portion 81b engages with an engagement hole 83a at the distal end portion of a plate spring 83. The plate spring 83 biases the retaining member 81 around the support portion 81a in a direction that separates the surface of the magnet 51 that faces the spool 12 from the rotating surface of the spool 12. The plate spring 83 is supported by the tubular portion 80 (refer to FIG. 8). FIG. 9 shows a state in which the spool 12 is not being rotated. When the fishing line is cast, the spool 12 rotates counterclockwise in FIG. 9.

Figure 10:
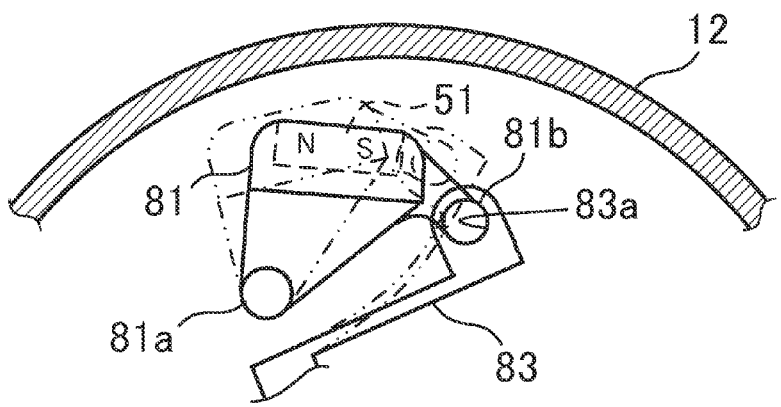
FIG. 10 is a diagram showing the operation of the spool braking device according to the second embodiment.

FIG. 10 is a diagram showing the operation of the spool braking device according to the second embodiment. The retaining member 81 and the magnet 51 represented by the solid lines show a state in which the spool 12 is not being rotated. The retaining member 81 and the magnet 51 represented by the chain double-dashed lines show a state in which the spool 12 is being rotated. In a state in which the spool is not being rotated, the retaining member 81 is biased by the plate spring 83, and the surface that opposes the rotating surface of the spool 12, specifically the magnetic pole that is farther from the axis of the support portion 81a of the magnet 51, is distanced from the rotating surface of the spool 12.

When the spool 12 is rotated, an eddy current corresponding to the rotational speed is generated in the spool 12 due to the flux of the magnet 51 that opposes the rotating surface of the spool 12. An induction force in a direction that is opposite of the rotational direction is applied to the spool 12 due to this eddy current. The brakes are thereby applied to the spool 12. With the reaction force converted into the induction force caused by the magnet 51 via the rotation of the spool 12 (movement of the spool surface), the magnet 51 is dragged the other way in the rotational direction of the spool 12. The retaining member 81 that holds the magnet 51 is pivotably supported by the support plate 82 via the support portion 81a (refer to FIG. 9); therefore, the retaining member 81 is rotated counter-clockwise in FIG. 10, around the support portion 81a. As a result, the surface of the magnet 51 that opposes the rotating surface of the spool 12, specifically the magnetic pole that is farther from the support portion 81a, approaches the rotating surface of the spool 12.

Figure 11:
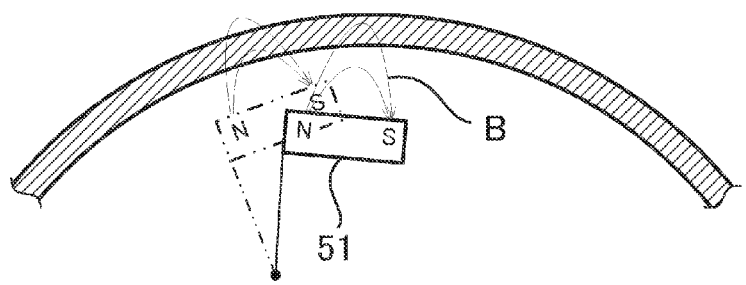
FIG. 11 is a conceptual diagram showing the action of the spool braking device according to the second embodiment.

FIG. 11 is a conceptual diagram showing the action of the spool braking device according to the second embodiment. In a state in which the spool 12 is not being rotated, the magnet 51 is far from the rotating surface of the spool 12; as a result, the flux B that intersects the rotating surface of the spool 12 is reduced, and the peak of the magnetic field at the rotating surface is small. When the spool 12 is rotated and the magnet 51 approaches the flux B that intersects the rotating surface of the spool 12 is increased, and the peak of the magnetic field at the rotating surface is increased. That is, the change rate of the flux B at the surface of the spool 12 that opposes the magnet 51 in the rotational circumferential direction of the spool is increased.

Figure 12A:
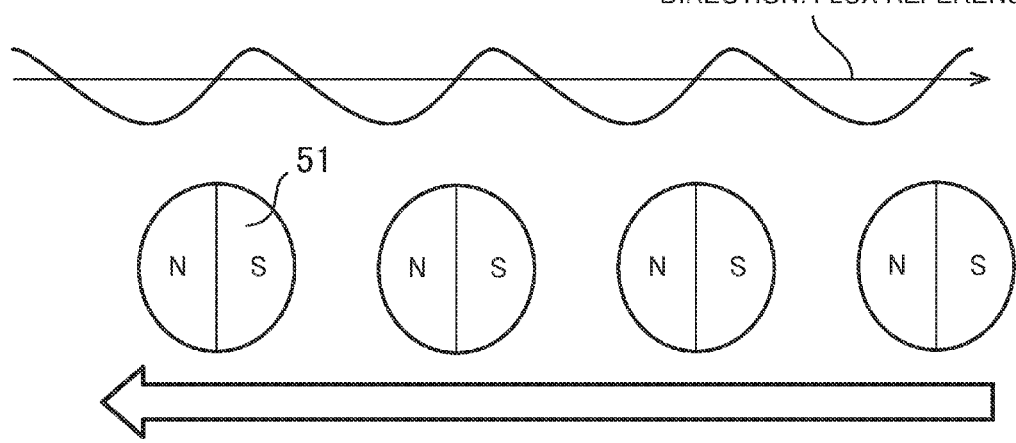
FIG. 12A is a conceptual diagram showing the flux when the spool braking device according to the second embodiment is stopped.
Figure 12B:
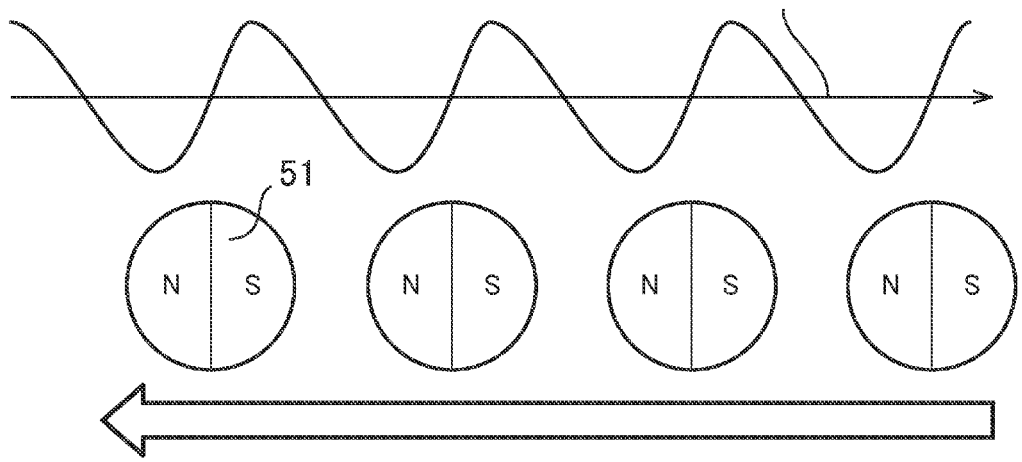
FIG. 12B is a conceptual diagram showing the flux when the spool braking device according to the second embodiment is in a braking state.

FIG. 12A is a conceptual diagram showing the flux when the spool braking device according to the second embodiment is stopped. FIG. 12B is a conceptual diagram showing the flux when the spool braking device according to the second embodiment is in a braking state. The white arrows in FIG. 12A and FIG. 12B show the direction in which the spool 12 rotates. As shown in FIG. 11, in a state in which the spool 12 is not being rotated, the magnet 51 separates from the rotating surface of the spool 12, and the S-pole is farther than the N-pole. For this reason, as compared to when the spool 12 is being rotated, the peak of the magnetic field at the rotating surface is small, and the flux on the S-pole side is less than the flux on the N-pole side. As shown in FIG. 12A, the amplitude of the flux is small and biased to one side of the flux reference line, indicating the rotational circumferential direction. As a result, the change rate of the flux in the rotational circumferential direction is small. When the spool 12 is rotated, the magnet 51 approaches the rotating surface of the spool 12, and the difference in the distances from the S-pole and the N-pole to the rotating surface is reduced. For this reason, the peak of the magnetic field at the rotating surface is increased, and the difference in the flux between the S-pole side and the N-pole side is decreased. As shown in FIG. 12B, the amplitude of the flux is increased, and this is represented at about the same size on the two sides of the flux reference line that indicates the rotational circumferential direction. As a result, the change rate of the flux in the rotational circumferential direction is increased. Since the induction force is proportional to the change rate of the flux, if the change rate of the flux in the rotational circumferential direction is increased, the induction force, that is, the braking force, is increased.

In the spool braking device 20 according to the second embodiment, the magnet 51 is turnably supported around an axis that is parallel to the rotating surface of the spool 12 and that is orthogonal to the rotational circumferential direction, which is separated from a surface that passes through the center of the magnet 51 and the rotational axis of the spool 12. The plate spring 83 biases the magnet 51 in a direction in which the surface of the magnet 51 that faces the spool 12 is separated from the rotating surface of the spool 12. Then, the change rate of the flux at the surface of the spool 12 that opposes the magnet 51 in the rotational circumferential direction of the spool 12 is increased, since the magnet 51 is rotated in a direction in which the surface of the magnet 51 that faces the spool 12 approaches the rotating surface of the spool 12, with the reaction force converted into the induction force caused by the magnet 51 via the rotation of the spool 12.

The plate spring 83 configures a biasing unit that moves the magnet 51 in a direction in which the change rate of the flux at a prescribed rotating surface in the rotational circumferential direction of the spool 12 is decreased. The support plate 82, the retaining member 81, and the engagement portion 81b can be described as being a moving mechanism for moving the magnet 51 in a direction in which the change rate of the flux at a prescribed rotating surface of the spool 12 in the rotational circumferential direction of the spool 12 is increased, with the reaction force converted into the induction force caused by the magnet 51 via the movement of the spool 12. In a way, the spool braking device 20 varies the change rate of the flux in the rotational circumferential direction that is affected by the magnet 51, at a prescribed rotating surface of the spool 12 having a prescribed unit width in the rotational axis direction, with the rotation of the spool 12.

In FIG. 8, the entire surface of the magnet 51 opposes the rotating surface of the spool 12, but the braking force as a whole can be varied by moving the spool braking device 20 in the rotational axis direction of the spool, in the same way as in the first embodiment. In the second embodiment, the initial braking force when the spool 12 begins to rotate can be changed by rotating the support plate 82 around the rotational axis of the spool 12 and changing the position of the support portion 81a of the retaining member 81. For example, when the support plate 82 is rotated counterclockwise in FIG. 9, the support portion 81a is separated from the engagement hole 83a of the plate spring 83, so that the magnet 51 is further distanced from the rotating surface of the spool 12. If the support plate 82 is rotated clockwise, the magnet 51 approaches the rotating surface of the spool 12. The ratio of the maximum braking force when the spool 12 is rotated and the minimum braking force at the start of rotation can be changed. The retaining member 81, the support plate 82, and the support spring 83 configure the magnetic flux change rate variable mechanism.

According to the spool braking device 20 of the second embodiment, the change rate of the flux in the rotational circumferential direction at a prescribed rotating surface having a prescribed unit width in the rotational axis direction of the conductor (spool 12) is varied by the rotation of the conductor, as a result, either the conductor or the magnet 51 does not need to be moved in the rotational axis direction, and reducing the weight and the size of the spool braking device 20 is possible.

The second embodiment is described with the spool 12 being the conductor as an example. However, the spool 12 does not need to be a conductor as long as there is a conductor that is linked to the spool 12. For example, a configuration in which a cylindrical conductor is bonded to the inner peripheral surface of a spool 12 formed from a nonconductive body is possible. In this case, the spool braking device 20 is disposed so that the magnet 51 opposes the conductor that is linked to the spool 12.

Additionally, in the second embodiment, a configuration is described in which the conductor is cylindrical. The spool braking device 20 can be applied as long as the conductor is rotated in conjunction with the spool 12. For example, the configuration of the second embodiment can be applied with modification to an embodiment in which the conductor is a disc. The disc is, for example, a flange 12a of the spool 12. In this embodiment, the magnet 51 is disposed opposing the disc surface and is pivotably supported around an axis that is parallel to the disc surface and that is orthogonal to the rotational circumferential direction, in a position that is separated from a surface that passes through the center of the magnet 51 and the rotational axis of the disc. The magnet 51 is biased in a direction in which the change rate of the flux at the surface of the disc that opposes the magnet 51 in the rotational circumferential direction of the disc is decreased.

In the second embodiment, four magnets 51 are provided as an example. The number of magnets 51 may be any number that is one or greater, as long as the magnet has an N-pole and an S-pole on a surface that faces the rotating surface of the conductor. However, preferably, two or more magnets 51 are provided and disposed in positions that are rotationally symmetrical, so that the positions to which the braking force is applied are symmetrical with respect to the rotational axis of the spool 12. Additionally, the magnets 51 are preferably disposed at equal intervals. The arrangement of the N-pole and the S-pole of the magnet 51 may be the opposite of that shown in FIG. 9-FIG. 12. Furthermore, the arrangement of the N-pole and the S-pole of the magnet 51 does not have to be the same for all of the magnets 51. For example, magnets with opposite arrangements of the N-pole and the S-pole may be alternately disposed in the circumferential direction in which the conductor is rotated.

What is claimed is:

1. A spool braking device for braking the rotation of a spool rotatably supported by a reel body, comprising:
   a conductor having a rotating surface and being configured to rotate in conjunction with the spool;
   a magnet comprising an N-pole and an S-pole on a surface facing the rotating surface of the conductor; and
   a magnetic flux change rate variable mechanism configured to change the change rate of flux in the rotational circumferential direction affected by the magnet at a prescribed rotating surface having a prescribed unit width in a direction orthogonal to the rotational circumferential direction of the conductor via the rotation of the conductor by moving the magnet in an axial direction.

2. The spool braking device recited in claim 1, wherein the magnetic flux change rate variable mechanism comprises
   a moving mechanism configured to move the magnet in a direction in which the change rate of the flux at a prescribed rotating surface in the rotational circumferential direction of the conductor is increased, with a reaction force to an induction force caused by the magnet via movement of the conductor.

3. The spool braking device recited in claim 1, wherein the magnet is turnably supported about an axis orthogonal to the rotating surface of the conductor, and
   the magnetic flux change rate variable mechanism comprises
   a rotating mechanism configured to rotate the magnet in a direction in which the N-pole and the S-pole are aligned with the rotational circumferential direction of the conductor, at a prescribed unit width in the direction orthogonal to the rotational circumferential direction of the rotating surface.

4. The spool braking device recited in claim 1, wherein the magnet is pivotably supported around an axis parallel to the rotational surface of the conductor, and
   the magnetic flux change rate variable mechanism comprises
   a pivoting mechanism configured to pivot the magnet in a direction in which both the N-pole and the S-pole approach the rotational circumferential direction of the conductor, at a prescribed unit width in a direction that is orthogonal to the rotational circumferential direction of the rotating surface.

5. The spool braking device recited in claim 1, wherein the magnet is one of two or more magnets, and
   the two or more magnets are disposed in rotationally symmetrical positions, with the rotational axis of the conductor as the symmetrical axis.

6. The spool braking device recited claim 1, wherein the spool is a nonmagnetic electrical conductor, and
   the spool and the conductor are integrally configured.

7. A fishing reel, comprising:
   the spool braking device recited in claim 1;
   a reel body attached to a fishing rod; and
   the spool rotatably supported by the reel body and being configured to wind fishing line onto an outer periphery thereof.

8. A spool braking device for braking the rotation of a spool rotatably supported by a reel body, comprising:
   a conductor having a rotating surface and being configured to rotate in conjunction with the spool;
   a magnet comprising an N-pole and an S-pole on a surface facing the rotating surface of the conductor; and
   a magnetic flux change rate variable mechanism configured to change the change rate of flux in the rotational circumferential direction affected by the magnet at a prescribed rotating surface having a prescribed unit width in a direction orthogonal to the rotational circumferential direction of the conductor via the rotation of the conductor
   the magnetic flux change rate variable mechanism comprises
   a moving mechanism configured to move the magnet in a direction in which the change rate of the flux at a prescribed rotating surface in the rotational circumferential direction of the conductor is increased, with a reaction force to an induction force caused by the magnet via movement of the conductor, and
   a biasing unit configured to move the magnet in a direction in which the change rate of the flux at a prescribed rotating surface in the rotational circumferential direction of the conductor is decreased.

9. A spool braking device for braking the rotation of a spool rotatably supported by a reel body, comprising:
   a conductor having a rotating surface and being configured to rotate in conjunction with the spool;
   a magnet comprising an N-pole and an S-pole on a surface facing the rotating surface of the conductor; and
   a magnetic flux change rate variable mechanism configured to change the change rate of flux in the rotational circumferential direction affected by the magnet at a prescribed rotating surface having a prescribed unit width in a direction orthogonal to the rotational circumferential direction of the conductor via the rotation of the conductor,
   the magnet is turnably supported about an axis orthogonal to the rotating surface of the conductor, and
   the magnetic flux change rate variable mechanism comprises
   a rotating mechanism configured to rotate the magnet in a direction in which the N-pole and the S-pole are aligned with the rotational circumferential direction of the conductor, at a prescribed unit width in the direction orthogonal to the rotational circumferential direction of the rotating surface, and
   the rotating mechanism comprises
   a rotating member rotatably supported about a rotational axis of the conductor,
   a cam holding the magnet and being turnably supported by the rotating member around a middle of the N-pole and the S-pole, while maintaining a direction of the surface of the magnet facing the conductor, and
   an engagement member engaging the cam and converting the movement of the magnet in a circumferential direction, the circumferential direction being a direction in which the conductor is rotated to turn the cam.

10. A spool braking device for braking the rotation of a spool rotatably supported by a reel body, comprising:
    a conductor having a rotating surface and being configured to rotate in conjunction with the spool;
    a magnet comprising an N-pole and an S-pole on a surface facing the rotating surface of the conductor; and
    a magnetic flux change rate variable mechanism configured to change the change rate of flux in the rotational circumferential direction affected by the magnet at a prescribed rotating surface having a prescribed unit width in a direction orthogonal to the rotational circumferential direction of the conductor via the rotation of the conductor, the magnet is turnably supported about an axis orthogonal to the rotating surface of the conductor, and the magnetic flux change rate variable mechanism comprises a rotating mechanism configured to rotate the magnet in a direction in which the N-pole and the S-pole are aligned with the rotational circumferential direction of the conductor, at a prescribed unit width in the direction orthogonal to the rotational circumferential direction of the rotating surface, and the rotating mechanism comprises a rotating member rotatably supported around a rotational axis of the conductor, a pinion holding the magnet, and including outer teeth on a periphery toward the surface of the magnet facing the conductor, and being turnably supported by the rotating member around a middle of the N-pole and the S-pole, while maintaining a direction of the surface of the magnet facing the conductor, and a rack meshing with the outer teeth of the pinion, including flat teeth formed in one row in the rotational circumferential direction of the conductor, and being fixed to the reel body.

\* \* \* \* \*